June 3, 1930.  D. GRATTAN  1,760,902
LUBRICANT DISTRIBUTING APPARATUS
Filed June 15, 1927  2 Sheets-Sheet 1
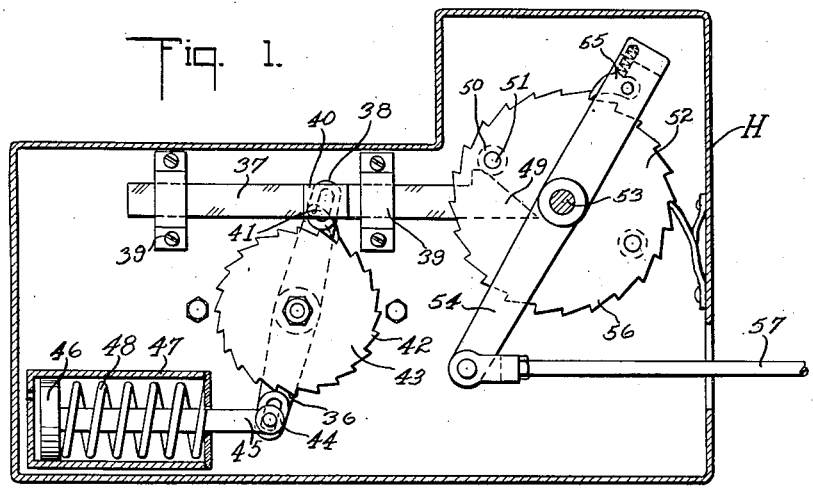
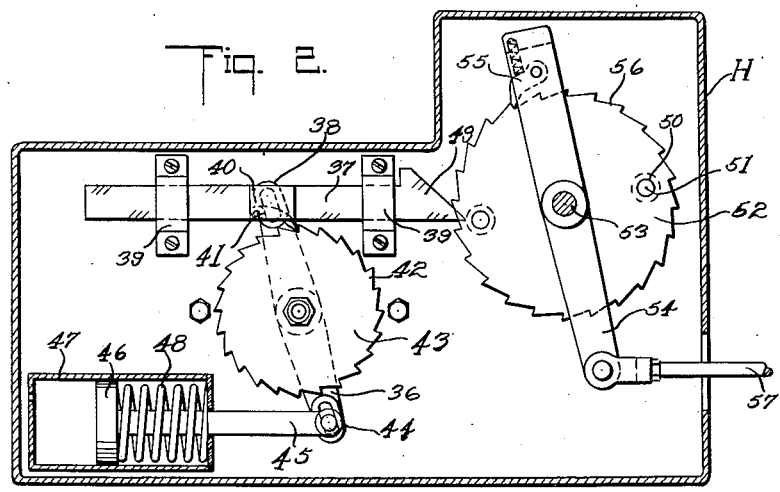
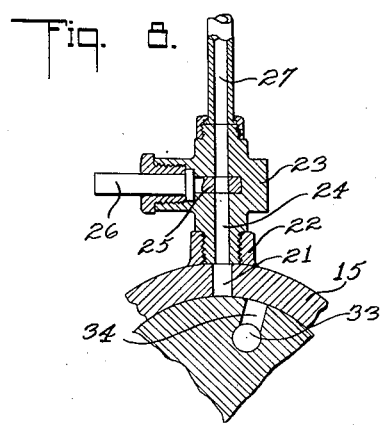
INVENTOR
David Grattan;
BY
ATTORNEY

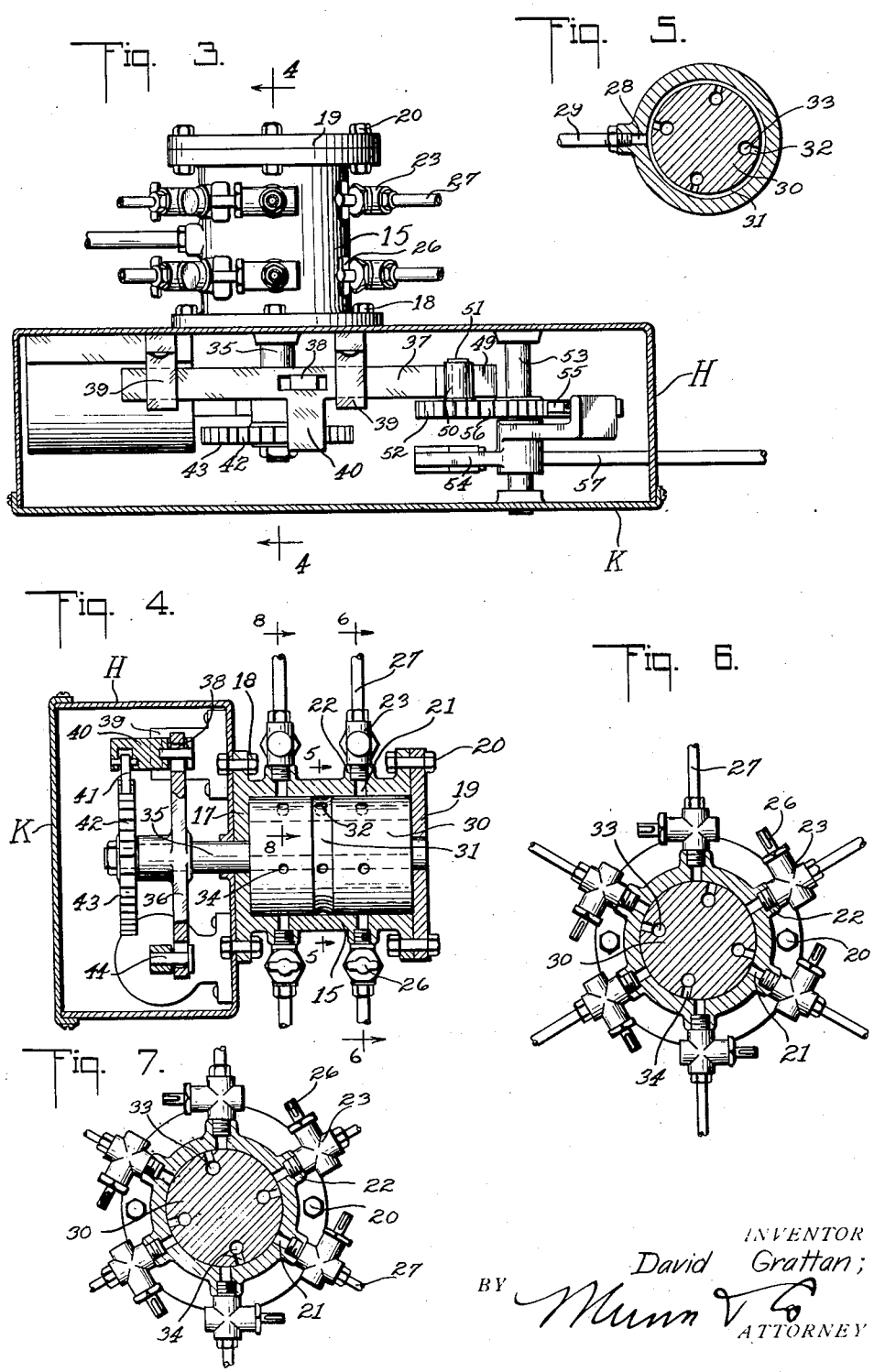

Patented June 3, 1930

1,760,902

UNITED STATES PATENT OFFICE

DAVID GRATTAN, OF LOS ANGELES, CALIFORNIA

LUBRICANT-DISTRIBUTING APPARATUS

Application filed June 15, 1927. Serial No. 199,021.

My invention relates to force feed lubricating systems for engines and the like, and it has for its purpose a provision of an apparatus by which the parts of an engine or the movable parts of a mechanism such as a locomotive, or both can be lubricated automatically through operation of the engine and in a manner to effect feed of the lubricant to all movable parts, the feeding being regulated so as to prevent excess delivery of the lubricant to the parts, and in such manner as to increase or decrease the lubricant delivered according as the speed of the engine increases or decreases.

My invention is particularly adapted, although not necessarily, for use in connection with the lubricating apparatus embodied in my co-pending application, Serial No. 66,845, filed November 4th, 1925. In the latter invention provision is made for placing a supply of lubricant under pressure, and my present invention is for distributing the lubricant as required.

It is also a purpose of my invention to provide a lubricant distributing apparatus in which the operation is such as to cease with discontinuance in operation of the engine or other prime mover whereby the possibility is eliminated of wasteful distribution of the lubricant to the movable parts being lubricated.

I will describe only one form of lubricant distributing apparatus embodying my invention, and will then point out the novel features thereof in claims.

In the accompanying drawings:

Fig. 1 is a view showing in side elevation, one form of lubricant distributing apparatus embodying my invention, with the apparatus in one extreme position of the casing thereof in section;

Fig. 2 is a view similar to Fig. 1 with the apparatus in the other extreme position;

Fig. 3 is a view showing the apparatus in top plan with the casing thereof in section;

Fig. 4 is a sectional view taken on the line 4—4 of Fig. 3;

Figs. 5 and 6 are vertical sectional views taken on the lines 5—5 and 6—6, respectively, of Fig. 4;

Fig. 7 is a view similar to Fig. 6 with the valve thereof in an advanced position; and Fig. 8 is a fragmentary sectional view taken on the line 8—8 of Fig. 6.

Similar reference characters refer to similar parts in each of the several views.

Referring specifically to the drawings, my invention in its present embodiment comprises a housing H, having a cover K. At the back of the casing is a distributing head including a tubular casing 15 closed at one end by a wall 17, and flanged for the reception of bolts 18, by which the casing as a unit is secured to the housing H. The open end of the casing is closed by a cover plate 19 secured thereto by bolts 20. Between its ends the casing is provided with two annular series of ports 21 communicating with interiorly threaded nipples 22 (Fig. 8), in which latter is received petcocks, each comprising a body 23 provided with a duct 24 and a valve 25 manually operable by stem 26 for regulating the passage of liquid through the duct. Connected to each petcock is a distributing pipe 27 adapted to extend to the respective movable part of the engine or other mechanism to be lubricated. The casing 15 is provided with a supply port 28 at a point between the two series of ports 21, and a pipe 29 is connected to the port 28 and to a suitable source of lubricant supply which is adapted to be placed under pressure by any suitable apparatus such as that embodied in my copending application hereinbefore referred to.

Rotatable within the casing 15 is a valve 30 provided with a peripheral annular groove 31 constituting an annular port which at all times is in communication with the supply port 28. As shown in Fig. 5, the valve 30 is formed with an annular series of circumferentially spaced radial ports 32, which extend inwardly from the port 31 for communication with longitudinal ports 33. As shown in Fig. 4, the ports 33 are coextensive in length with the valve 30, and they in turn communicate with two annular series of circumferentially spaced ports 34 so positioned that when the valve is rotated they will successively register with the casing ports 21.

The valve 30 is adapted to be rotated in a step by step movement, and in a manner to cause the ports 34 to momentarily register with the ports 21, so that when the valve is at rest the ports 34 will be out of registration with the ports 21. To obtain this movement of the valve any suitable mechanism may be employed. In the present instance the mechanism comprises a stem 35 for the valve 30 which is journaled in and extends into the housing H. Supported for rocking movement on the stem is an arm 36 operatively connected at its upper end to a bar 37, through a pin and slot connection 38. The bar in turn is supported for reciprocating movement within guides 39 secured to the housing H. Upon a lateral projection 40 of the bar 37 a pawl 41 is pivoted to engage the teeth 42 of a ratchet wheel 43 fixed to the stem 35. The arrangement of the pawl 41 and the teeth 42 is such that when the bar 37 is moved to the right as when viewed in Fig. 1, the pawl will have operative engagement with the teeth to rotate the wheel 43 and consequently the valve 30. Conversely when the bar 37 is moved in the opposite direction the pawl will pass freely over the teeth 42 and thus be ineffective to rotate the wheel 43. Through a pin and slot connection 44 the lower end of the arm 36 is operatively connected to the rod 45 of a piston 46 movable in a cylinder 47. A coiled spring 48 is interposed between the piston 46 and one end of the cylinder to yieldably urge the arm 36 to the extreme position shown in Fig. 1.

The right-hand end of the bar 37 is constructed to provide a cam 49 adapted to be engaged by rollers 50 on pins 51 fixed at diametrically opposed points on the inner face of a ratchet wheel 52. The wheel 52 is fixed to a shaft 53 journaled in the housing H, while rotatable on the shaft is an arm 54 carrying at its upper end a pawl 55 spring pressed to engage the teeth 56 of the wheel 52. The arm 54 is adapted to be oscillated by reciprocation of a rod 57, which may be connected to the valve gear of a steam engine, the parts of which latter are adapted to be lubricated by a lubricant delivered to the pipes 27.

The operation of the apparatus is as follows: With the parts of the mechanism in the position shown in Fig. 1 and the valve 30 occupying the position shown in Fig. 6, movement of the rod 57 from the position shown in Fig. 2 will rock the arm 54 to cause partial rotation of the ratchet wheel 52 through the coaction of the pawl 55 with the teeth 56. With the wheel 52 rotated in this manner the rollers 50 are caused to successively engage the cam 49, and as each roller abuts the cam the bar 37 is moved from the position shown in Fig. 1 to that shown in Fig. 2. Under such movement the arm 36 is rocked to the position shown in Fig. 2, thereby actuating the piston 46 to compress the spring 48, and moving the pawl 41 freely over the teeth 42 to the position shown. As soon as the roller moves free of the cam 49 the spring 48 expands, thus returning the arm 36 to the position shown in Fig. 1, and thereby causing the pawl 41 to engage the teeth 42 and partially rotate the wheel 43. As the wheel 43 is fixed to the stem 35, partial rotation of the valve 30 is effected so as to move the latter from the position shown in Fig. 6 to that shown in Fig. 7. During this movement certain of the ports 34 momentarily register with certain of the ports 21, coming to rest at points out of registration with the ports 21. As the two ports register, lubricant is discharged into the pipes 27, the lubricant in the supply pipe 29 circulating from the annular ports 30 through the longitudinal ports 33 into the radial ports 32, and then outwardly through the ports 34 into the pipes. As the lubricant is under pressure it will be clear that oil discharged into the pipes will be delivered to the movable parts of a mechanism to which the pipes are connected and thereby lubricate the latter. As the ports 34 only momentarily register with the ports 21 relatively small quantities of lubricant are discharged into the pipes 21. However, the quantity of lubricant supplied to any one pipe can be regulated by the corresponding petcock, so that lubricant in the required quantity is delivered to the part to be lubricated. As each pipe 27 is provided with a petcock, it is apparent that regulation of lubricant discharged thereinto and delivered to the corresponding movable parts can be controlled independently of the other pipes.

Should the engine or other prime mover operating the rod 57 come to rest, the valve 30 will always be in a position in which the ports 34 are out of registration with the ports 31, so that the possibility is eliminated of lubricant being delivered to the pipes 27 when the apparatus is at rest, and thereby preventing waste of the lubricant.

Although I have herein shown and described only one form of lubricant distributing apparatus embodying my invention, it is to be understood that various changes and modifications may be made herein without departing from the spirit of the invention and the spirit and scope of the appended claims.

I claim as my invention:

1. An apparatus for distributing lubricant to the movable parts of mechanism, comprising a plurality of distributing pipes, a distributing head adapted for connection to a source of lubricant under pressure and connected to the pipes, and mechanism for actuating the distributing head to cause lubricant from the source of supply to be delivered to each pipe at intervals, the arrangement of the pipes in respect to said head and the operation of said mechanism being such that when said mechanism ceases operation said head ceases to deliver lubricant to any of the pipes.

2. An apparatus for distributing lubricant to the movable parts of a mechanism, comprising a valve adapted for connection to a source of lubricant under pressure, a casing for the valve, ports in the casing and valve, distributing conduits connected to the casing ports, and mechanism for moving the valve to cause the valve and casing ports to register and to discontinue movement of the valve when occupying a position wherein said ports are out of registration.

3. An apparatus for distributing lubricant to the movable parts of a mechanism, comprising a valve adapted for connection to a source of lubricant under pressure, a casing for the valve, ports in the casing and valve, distributing conduits connected to the casing ports, and mechanism for intermittently moving the valve to momentarily cause the valve and casing ports to register and to discontinue movement of the valve when occupying a position wherein said ports are out of registration.

4. An apparatus for distributing lubricant to the movable parts of a mechanism, comprising a valve adapted for connection to a source of lubricant under pressure, a casing for the valve, ports in the valve and casing, pipes connected to the casing ports, and mechanism for intermittently moving the valve so that lubricant from the source of supply is delivered through said ports to each pipe at intervals, the arrangement of said ports being such that when the mechanism discontinues operation, the valve will be so positioned that further delivery of lubricant to the pipes ceases.

5. An apparatus for distributing lubricant to the movable parts of a mechanism, comprising a valve adapted for connection to a source of lubricant under pressure, a casing for the valve, ports in the casing and valve, pipes connected to the casing ports, and mechanism for intermittently moving the valve so that the ports thereof register with the casing ports only during movement of the valve, thereby delivering lubricant to each pipe at intervals from said source of supply.

6. In an apparatus for distributing lubricant to the movable parts of a mechanism, a casing, radial ports in the casing, distributing pipes connected, respectively, to each of said ports, a valve rotatable in the casing, radial ports in the valve adapted to register with the casing ports, other radial ports in the valve out of registration with the casing ports, longitudinal ports in the valve providing communication between the first and second mentioned valve ports, an annular peripheral valve port communicating with all of the second mentioned radial valve ports, and a pipe connected to the casing for supplying a lubricant under pressure to the annular port.

7. An apparatus for distributing lubricant to the movable parts of a mechanism, comprising a rotary valve, and mechanism for rotating the valve in a step by step movement, said mechanism comprising a pawl and ratchet device adapted for operative connection to a prime mover to be actuated thereby, a second pawl and ratchet device operatively connected to the valve and yieldably urged to one position, and means connecting the two devices so that the first device is operable to move the other device to another position and then release the same, whereby the second device will return to its urged position and thereby rotate the valve.

8. An apparatus for distributing lubricant to the movable parts of a mechanism, comprising a rotary valve, and a mechanism for rotating the valve in a step by step movement, said mechanism comprising a ratchet wheel fixed to the stem of said valve, an arm fulcrumed on the valve stem, a bar supported for reciprocating movement and operatively connected to the arm to rock the latter when reciprocated, a pawl carried by the bar and engaging the ratchet wheel so that when the bar is reciprocated the ratchet wheel will be rotated in one direction, a spring connected to the arm for yieldably urging the latter in such direction as to cause the pawl to rotate said wheel, and means for intermittently moving the bar to a position in which the arm is moved to another position against the action of said spring, whereby when the bar is released the spring will respond to move the arm to the first position and thereby cause the pawl to rotate said wheel.

9. An apparatus as embodied in claim 7, wherein said means comprises a ratchet wheel, projections on the wheel, a cam on the bar in the path of movement of said projections, an arm supported for oscillating movement, a pawl carried by the arm and engaging the ratchet wheel, and means by which the arm is oscillated to cause said pawl to rotate said wheel in one direction whereby the projections engage said cam to actuate said bar.

10. In an apparatus for distributing lubricant to the movable parts of a mechanism, a casing, ports in the casing, distributing valves connected to the ports, a valve rotatable in the casing, ports in the valve adapted to register with the casing ports, other ports in the valve communicating with the first ports, and means for rotating the valve in a step by step movement and in such manner that when the valve is at rest the ports thereof are out of registration with the casing ports.

DAVID GRATTAN.